United States Patent
Hanks

(10) Patent No.: US 12,176,126 B2
(45) Date of Patent: Dec. 24, 2024

(54) PASS-THROUGH ELEMENT PROTECTOR

(71) Applicant: Brian Hanks, The Colony, TX (US)

(72) Inventor: Brian Hanks, The Colony, TX (US)

(*) Notice: Subject to any disclaimer, the term of this patent is extended or adjusted under 35 U.S.C. 154(b) by 218 days.

(21) Appl. No.: 17/947,451

(22) Filed: Sep. 19, 2022

(65) Prior Publication Data
US 2023/0086866 A1    Mar. 23, 2023

Related U.S. Application Data

(60) Provisional application No. 63/246,427, filed on Sep. 21, 2021.

(51) Int. Cl.
*H01B 17/26* (2006.01)
(52) U.S. Cl.
CPC .................... *H01B 17/26* (2013.01)
(58) Field of Classification Search
None
See application file for complete search history.

(56) References Cited

U.S. PATENT DOCUMENTS

| | | | | |
|---|---|---|---|---|
| 2,941,025 | A * | 6/1960 | Wayman | H01B 17/308 174/653 |
| 6,779,232 | B2 * | 8/2004 | Cerul | F16L 5/00 411/113 |
| D763,661 | S * | 8/2016 | Ezell | D8/349 |
| 2003/0159242 | A1 * | 8/2003 | Cerul | E04B 2/80 16/2.1 |

* cited by examiner

*Primary Examiner* — Krystal Robinson
(74) *Attorney, Agent, or Firm* — VOLENTINE, WHITT & FRANCOS, PLLC; Joshua M Povsner

(57) ABSTRACT

A pass-through element protector includes a metal casting, an opening, a plate, and a plurality of teeth. The metal casting is formed as a partial enclosure around a central axis with an inner surface facing the central axis and an outer surface facing away from the central axis. The opening is provided in the partial enclosure from the inner surface to the outer surface. The plate at least partially closes the partial enclosure at one end along the central axis. The teeth are provided on the plate facing the partial enclosure to fasten the pass-through element protector to a support structure.

18 Claims, 12 Drawing Sheets

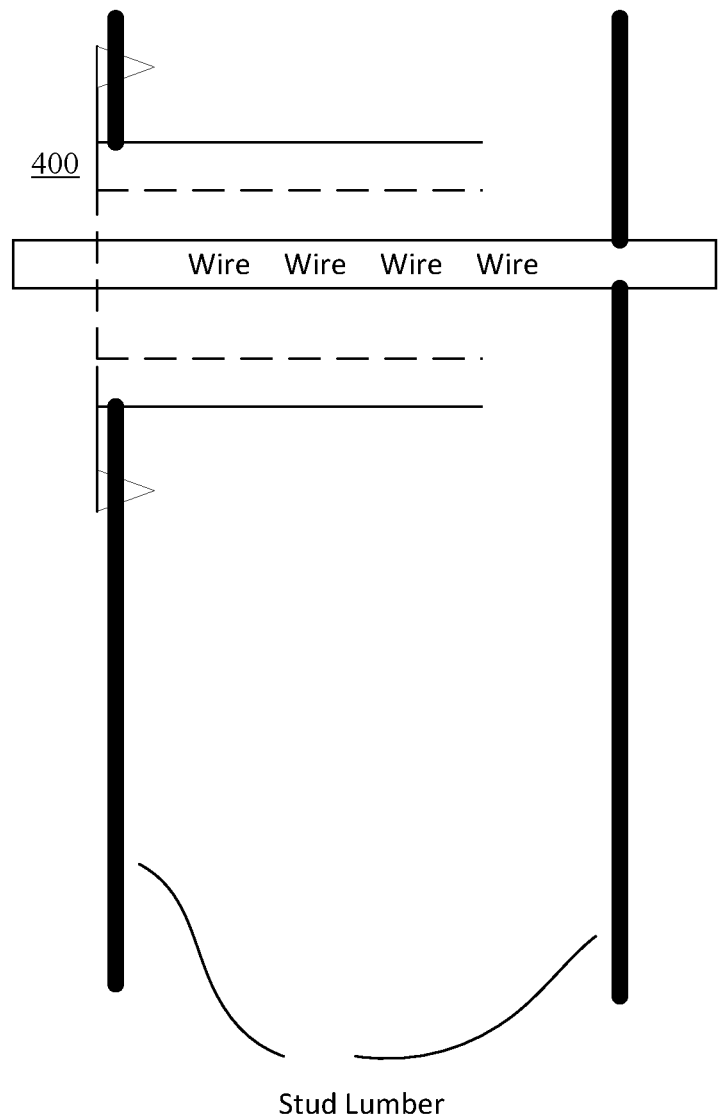

831

832

PASS-THROUGH ELEMENT PROTECTOR

CROSS-REFERENCE TO RELATED APPLICATION

This U.S. non-provisional patent application claims the benefit of priority under 35 U.S.C. § 119(e) to U.S. Provisional Patent Application No. 63/246,427, filed on Sep. 21, 2021 in the United States Patent and Trademark Office, the disclosure of which is incorporated herein in its entirety by reference.

BACKGROUND

1. Field of the Disclosure

The present disclosure relates to the field of construction. More particularly, the present disclosure relates to protection tools and systems for pass-through elements used in construction.

2. Background Information

In modern construction, materials such as wires, pipes and other pass-through elements are sometimes run through support members such as construction stud lumber. However, when the materials and support members are within walls and behind drywall, for example, the presence of the wires, pipes and other pass-through elements may not be apparent to an individual driving a new object into the support members. Accordingly, wires, pipes and other pass-through elements running through the support members may sometimes be damaged, such as by an individual hanging a picture or performing another innocuous activity.

BRIEF DESCRIPTION OF THE DRAWINGS

FIG. 4A illustrates a right side view of a pass-through element protector in use, according to an aspect of the present disclosure;

DETAILED DESCRIPTION

In view of the foregoing, the present disclosure, through one or more of its various aspects, embodiments and/or specific features or sub-components, is thus intended to bring out one or more of the advantages as specifically noted below.

Figure 1A:
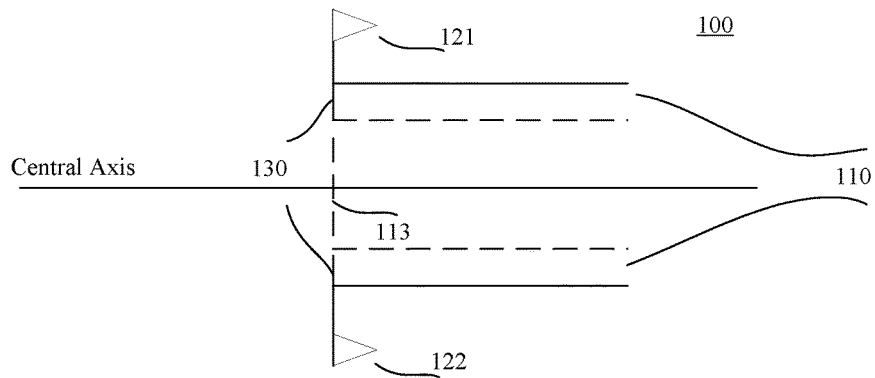
FIG. 1A illustrates a right side view of a pass-through element protector, according to an aspect of the present disclosure.

FIG. 1A illustrates a right side view of a pass-through element protector, according to an aspect of the present disclosure.

In FIG. 1A, a pass-through element protector 100 includes a metal casting 110, a plate 130, and a plurality of teeth on the plate 130 including a first tooth 121 and a second tooth 122. Pass-through element protectors described herein may be wire protectors, pipe protectors, or protectors configured and/or designed to protect other types of existing pass-through elements which sometimes pass through support structures. The metal casting 110 is formed to partly enclose a partial enclosure around a central axis. The partial enclosure that is partly enclosed by the metal casting 110 around the central axis is directly adjacent to and continuous with a passage 113 that passes through the plate 130. One end of the metal casting 110 is connected to the plate 130 and an opposite end of the metal casting 110 is configured to be inserted first into a hole in a support structure such as by being inserted into construction stud lumber. The metal casting 110 is formed around an open space running along the central axis from the plate 130 to the opposite end of the metal casting 110. The open space comprises the partial enclosure.

The pass-through element protector 100 may be pre-assembled at a manufacturing assembly such as by being molded as a composite piece. Alternatively, the metal casting 110 may be configured to be assembled with the plate 130 in use, such as by threading the metal casting 110 to threads (not shown) in the plate 130. Alternatively, the metal casting 110 may be welded to the plate 130, glued to the plate 130 or otherwise attached to the plate 130.

The pass-through element protector 100 is configured to allow passage of an existing wire, pipe, or other pass-through element through the partial enclosure of the metal casting 110. The pass-through element protector 100 may be slipped over the existing wire, pipe, or other pass-through element. The metal casting 110 has a gap or opening in the material which forms the casting along the entire length of the metal casting 110, so from the plate 130 to the opposite end of the metal casting 110. The gap or opening faces upwards or downwards when an existing wire, pipe or other pass-through element is inserted into the support structure so as to protect the existing wire, pipe, or other pass-through element from contact with hardware subsequently being inserted into the support structure. As likely common uses of the pass-through element protector 100, the pass-through element protector 100 is configured to be inserted into the support structure with the wire, pipe or other pass-through element partially enclosed within the pass-through element protector 100 along the central axis within the pass-through element protector 100. The pass-through element protector 100 may be installed to the support structure by passing the metal casting 110 in the hole in the support structure until the plurality of teeth on the plate 130 embed in the support structure. Each of the plurality of teeth may be configured to be driven into support structures in the manner of a nail, and therefore may have a circumference that grows larger away from a tip.

The plurality of teeth on the plate 130 face the support structure, and are used to fasten the pass-through element protector 100 to the support structure. As an alternative to the plurality of teeth on the plate 130, self-tapping screws may be provided on one side of the plate 130 along with pre-set holes for screwing the self-tapping screws through the plate 130 to attach the pass-through element protector 100 to the support structure.

Pass-through element protectors described herein, including the pass-through element protector 100 in FIG. 1A, may be molded of rust-proof, rust-resistant, corrosion-proof, or corrosion resistant materials. For example, pass-through element protectors may be made of stainless steel, aluminum, copper, bronze, brass, or galvanized steel. If use of the pass-through element protectors is reasonably assured to be in a location that will be maintained entirely dry, other types of metals which are not particularly sensitive to moisture may be used for molding some of the pass-through element protectors described herein.

Figure 1B:
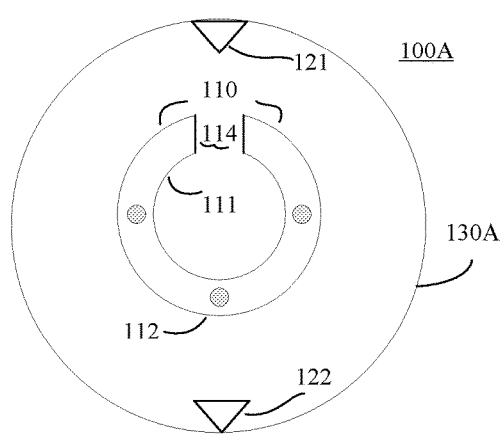
FIG. 1B illustrates a front view of an embodiment of the pass-through element protector in FIG. 1A, according to an aspect of the present disclosure.

FIG. 1B illustrates a front view of an embodiment of the pass-through element protector in FIG. 1A, according to an aspect of the present disclosure.

As shown in FIG. 1B, the pass-through element protector 100A again includes the plurality of teeth on the plate 130 including the first tooth 121 and the second tooth 122. The metal casting 110 is shown to be formed as a partial enclosure around the central axis with an inner surface 111 facing the central axis and an outer surface 112 facing away from the central axis, and a gap or opening 114 in the material of the partial enclosure from the inner surface 111 to the outer surface 112. The plate 130A in FIG. 1B is shown from the outer circular profile 115 of the pass-through element protector 100A and is formed through to the inner surface 111.

Figure 1D:
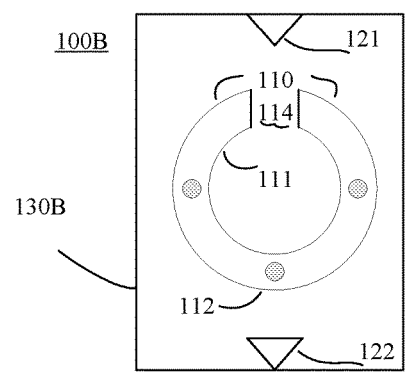
FIG. 1D illustrates a front view of another embodiment of the pass-through element protector in FIG. 1A, according to an aspect of the present disclosure.
Figure 1C:
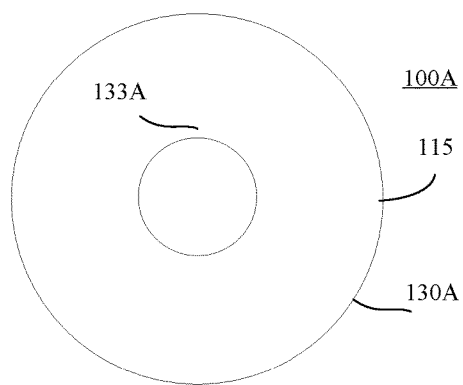
FIG. 1C illustrates a back view of the embodiment of the pass-through element protector in FIG. 1B, according to an aspect of the present disclosure.

FIG. 1C illustrates a back view of the embodiment of the pass-through element protector in FIG. 1B, according to an aspect of the present disclosure.

In FIG. 1C, the plate 130A is shown to have an inner diameter 133A that coincides with the inner surface 111 of the metal casting 110. As shown in FIG. 1C, the plate 130A comprises at least one ring installed at the one end of the metal casting 110 to partially close the opening 114.

FIG. 1D illustrates a front view of another embodiment of the pass-through element protector in FIG. 1A, according to an aspect of the present disclosure.

As shown in FIG. 1D, the pass-through element protector 100B again includes the plurality of teeth on the plate 130 including the first tooth 121 and the second tooth 122. The metal casting 110 is shown to be formed as a partial enclosure around a central axis with the inner surface 111 facing the central axis and the outer surface 112 facing away from the central axis, and the gap or opening 114 in the material of the partial enclosure from the inner surface 111 to the outer surface 112. The plate 130B in FIG. 1D is shown from outer rectangular profile 116 of the pass-through element protector 100B and is formed through to the inner surface 111.

Figure 1E:
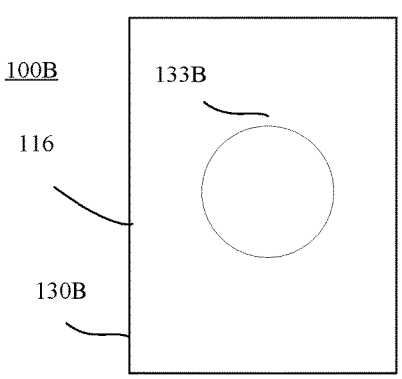
FIG. 1E illustrates a back view of the embodiment of the pass-through element protector in FIG. 1D, according to an aspect of the present disclosure.

FIG. 1E illustrates a back view of the embodiment of the pass-through element protector in FIG. 1D, according to an aspect of the present disclosure.

In FIG. 1E, the plate 130B is shown to have an inner diameter 133B that coincides with the inner surface 111 of the partial enclosure of the metal casting 110.

As should be clear from the difference between FIG. 1B and FIG. 1D and the difference between FIG. 1C and FIG. 1E, the plate 130 in embodiments based on FIG. 1A may have any outer profile shape as long as the outer profile encompasses the inner diameter 133A in FIG. 1B and FIG. 1C and the inner diameter 133B in FIG. 1D and FIG. 1E.

In embodiments that provide an alternative to or supplement to the plurality of teeth shown in FIG. 1A, FIG. 1B and FIG. 1D, self-tapping screws may be provided on the rear (to the left in FIG. 1A) of the plate 130. The self-tapping screws may be screwed into the support structure when the metal casting 110 is inserted into the support structure and the plate 130 abuts the support structure. The self-tapping screws may be configured to attach the plate 130 to the support structure in which the pass-through element protector 100 is inserted.

Figure 2A:
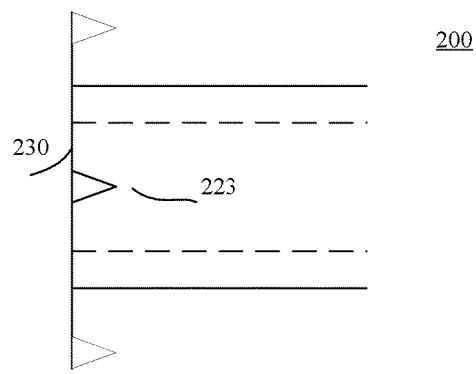
FIG. 2A illustrates a right side view of another pass-through element protector, according to an aspect of the present disclosure.

FIG. 2A illustrates a right side view of another pass-through element protector, according to an aspect of the present disclosure.

Relative to the pass-through element protector 100 shown in FIG. 1A, the pass-through element protector 200 may include the same elements in addition to an additional tooth shown as a third tooth 223. Additionally, the plate 230 does not have the passage 113 which is provided in the plate 130 in FIG. 1A.

Figure 2B:
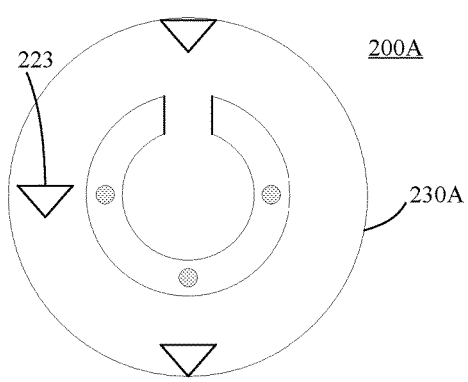
FIG. 2B illustrates a front view of an embodiment of the pass-through element protector in FIG. 2A, according to an aspect of the present disclosure.

FIG. 2B illustrates a front view of an embodiment of the pass-through element protector in FIG. 2A, according to an aspect of the present disclosure.

As shown in FIG. 2B, the pass-through element protector 200A includes a third tooth 223, and the plate 230A has a solid circular profile with no passage therethrough. The third tooth 223 is formed on the plate 230A to the outside of the metal casting. The third tooth 223 may be the same size and shape as the other teeth, or may be of a different size and a different shape than one or more of the other teeth.

Figure 2D:
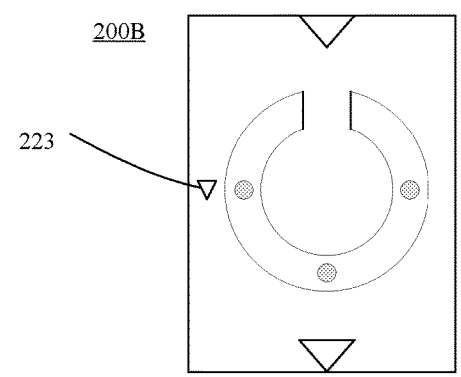
FIG. 2D illustrates a front view of another embodiment of the pass-through element protector in FIG. 2A, according to an aspect of the present disclosure.
Figure 2C:
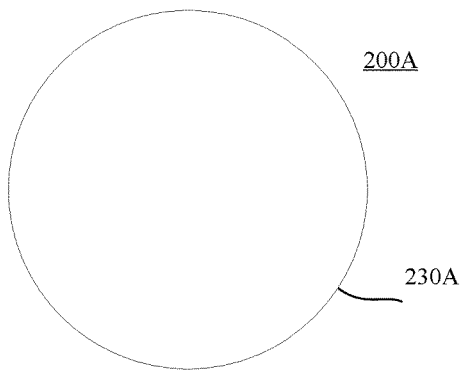
FIG. 2C illustrates a back view of the embodiment of the pass-through element protector in FIG. 2B, according to an aspect of the present disclosure.

FIG. 2C illustrates a back view of the embodiment of the pass-through element protector in FIG. 2B, according to an aspect of the present disclosure.

As shown in FIG. 2C, the back of the plate 230A is solid and does not have a passage therethrough.

FIG. 2D illustrates a front view of another embodiment of the pass-through element protector in FIG. 2A, according to an aspect of the present disclosure.

As shown in FIG. 2D, the pass-through element protector 200B includes the third tooth 223, and the plate 230B has a solid rectangular profile instead of the solid circular profile for the plate 230A in FIG. 2B. The third tooth 223 is formed on the plate 230B to the outside of the metal casting. The third tooth 223 in FIG. 2D has a different size and different shape (internal angles of the triangle) compared to the other teeth, though the third tooth 223 in FIG. 2D may be of the same size and the same shape as one or more of the other teeth.

Figure 2E:
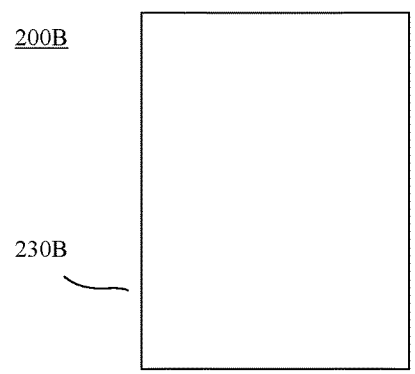
FIG. 2E illustrates a back view of the embodiment of the pass-through element protector in FIG. 2D, according to an aspect of the present disclosure.

FIG. 2E illustrates a back view of the embodiment of the pass-through element protector in FIG. 2D, according to an aspect of the present disclosure.

As shown in FIG. 2E, the back of the plate 230B is solid and does not have a passage therethrough.

In embodiments based on FIG. 2A, the number of teeth is not limited to three. The teeth of the pass-through element protector in FIG. 2E and other embodiments herein may be placed at positions different than shown relative to the metal casting on the plate 230.

Figure 3A:
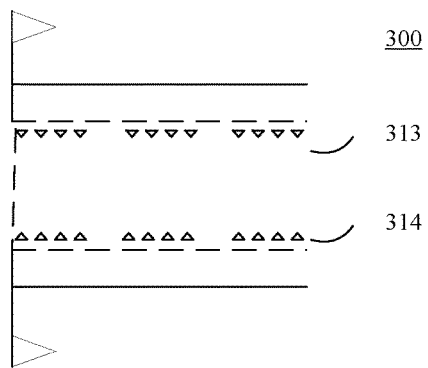
FIG. 3A illustrates a right side view of another pass-through element protector, according to an aspect of the present disclosure.

FIG. 3A illustrates a right side view of another pass-through element protector, according to an aspect of the present disclosure.

In FIG. 3A, a pass-through element protector 300 includes the configuration of FIG. 1A, and also includes additional components of a second set of teeth 313 and a third set of teeth 314. The second set of teeth 313 and the third set of teeth 314 are representative of components that may be used to maintain a wire, pipe, or other pass-through element in place within the pass-through element protector 300. The second set of teeth 313 and the third set of teeth 314 are internal to the metal casting in the pass-through element protector 300, such as by being fixed to or formed as part of an internal surface of the pass-through element protector 300. Alternatives to teeth include frictional components such as sandpaper, adhesive material such as glue, or any other components that may be used to prevent a wire, pipe, or other pass-through element from moving laterally within the pass-through element protector 300. Alternatives to teeth internal to the metal casting in the pass-through element protector 300 include insulation or another type of internal layer placed within the metal casting of the pass-through element protector 300, and such alternatives may provide dual functionality such as placement maintenance and insulation for a temperature-sensitive pass-through element.

Figure 3B:
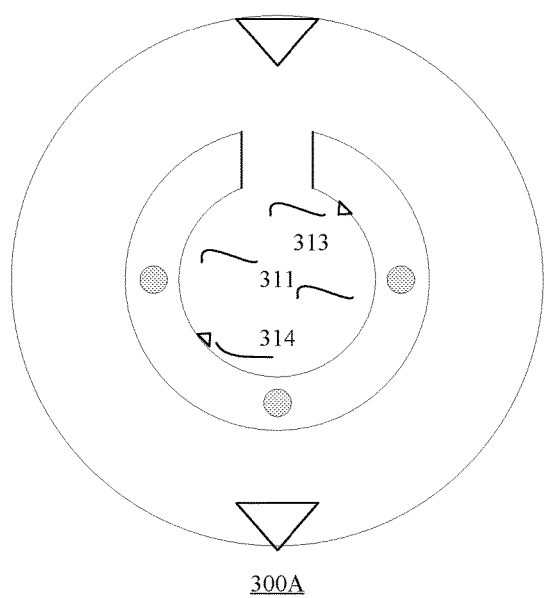
FIG. 3B illustrates a front view of an embodiment of the pass-through element protector in FIG. 3A, according to an aspect of the present disclosure.

FIG. 3B illustrates a front view of an embodiment of the pass-through element protector in FIG. 3A, according to an aspect of the present disclosure.

As shown, the second set of teeth 313 and the third set of teeth 314 are placed on opposite sides of the inner surface 311 of the pass-through element protector 300. The numbers of sets of teeth or components used to maintain a wire, pipe, or other pass-through element in place within the pass-through element protector 300 is not limited to two, and may be as few as one and as many as enough to cover the entirety of the inner surface 311 of the pass-through element protector 300. Additionally, the number of teeth is not limited to the number illustrated in FIG. 3A, and instead may be as few as one and as many as enough to provide one or more lines of teeth from one end of the inner surface to the other end of the inner surface 311. In FIG. 3B, the outer profile of the pass-through element protector 300A is shown as a circle.

The second set of teeth 313 and the third set of teeth 314 may have shapes that are different than shown in FIG. 3A. For example, the teeth of the second set of teeth 313 and the third set of teeth 314 may be biased so as to point to the right or to the left in FIG. 3A, rather than to point towards the central axis.

Figure 3C:
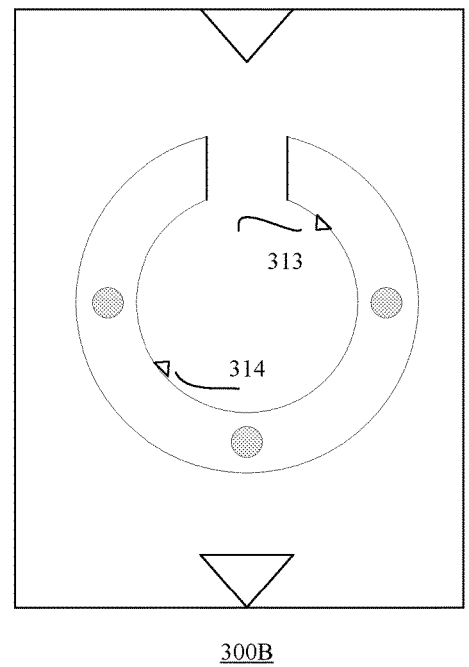
FIG. 3C illustrates a front view of another embodiment of the pass-through element protector in FIG. 3A, according to an aspect of the present disclosure.

FIG. 3C illustrates a front view of another embodiment of the pass-through element protector in FIG. 3A, according to an aspect of the present disclosure.

In FIG. 3C, the outer profile of the pass-through element protector 300B is shown as a rectangle, but otherwise the components within the pass-through element protector 300B are the same as the components within the pass-through element protector 300A in FIG. 3A.

FIG. 4A illustrates a right side view of a pass-through element protector in use, according to an aspect of the present disclosure.

In FIG. 4A, a pass-through element protector 400 is placed within construction stud lumber, and a wire, pipe or other pass-through element is placed within the pass-through element protector 400. The pass-through element protector 400 in FIG. 4A is based on the configuration of FIG. 1A.

In use, a pass-through element protector described herein, such as the pass-through element protector 400, may be placed within construction stud lumber in parallel with the direction of a wall so that wires, pipes, or other pass-through elements may be run along walls and through construction stud lumber within the pass-through element protectors. In this way, when any object such as a nail or screw is subsequently placed within the stub lumber, such as through painted drywall, the pass-through element protector may protect the wire, pipe or other pass-through element that is running through the pass-through element protector within the construction stud lumber.

Figure 5A:
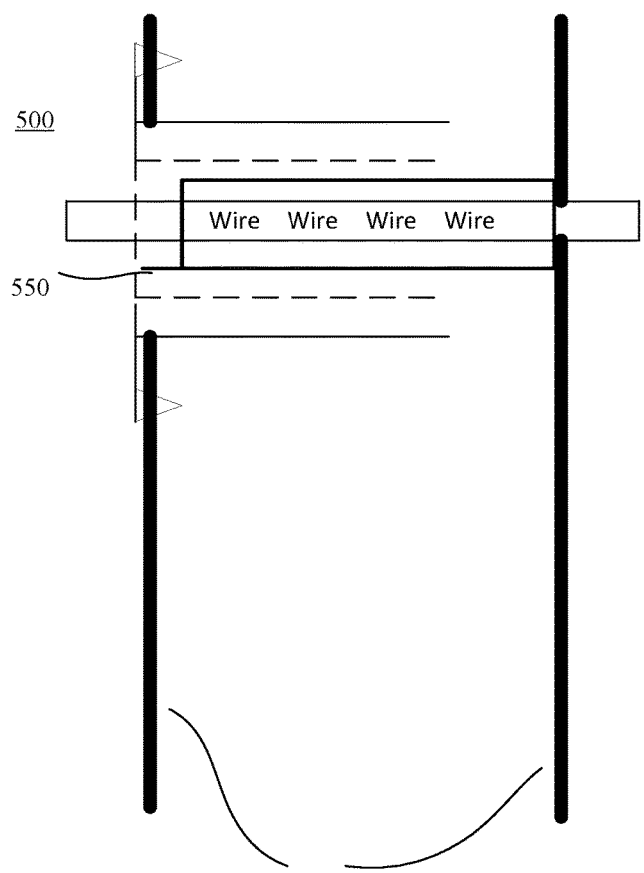
FIG. 5A illustrates a right side view of a pass-through element protection system in use, according to an aspect of the present disclosure.

FIG. 5A illustrates a right side view of a pass-through element protection system in use, according to an aspect of the present disclosure.

In FIG. 5A, a pass-through element protection system 500 includes a pass-through element protector based on the configuration of FIG. 1A and a sleeve 550. The sleeve 550 may be used when a hole in construction stud lumber is wider than a preset diameter of the partial enclosure of the metal casting. The sleeve 550 may be anything from a full circle to something less than a half circle. The sleeve 550 may also be used to retain the wire, pipe, or other pass-through element in the pass-through element protection system 500, by ensuring that the wire, pipe, or other pass-through element does not slip through the opening in the partial enclosure of the metal casting of the pass-through element protection system 500. As a reminder, an example of such an opening is the gap or opening 114 in FIGS. 1B and 1n FIG. 1D.

Figure 5B:
FIG. 5B illustrates a front view of an embodiment of a sleeve of the pass-through element protection system in FIG. 5A, according to an aspect of the present disclosure.

FIG. 5B illustrates a front view of an embodiment of a sleeve of the pass-through element protection system in FIG. 5A, according to an aspect of the present disclosure.

In FIG. 5B, the sleeve 551 is a half circle.

Figure 5C:
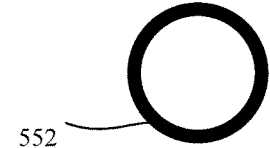
FIG. 5C illustrates a front view of another embodiment of the sleeve of the pass-through element protection system in FIG. 5A, according to an aspect of the present disclosure.

FIG. 5C illustrates a front view of another embodiment of the sleeve of the pass-through element protection system in FIG. 5A, according to an aspect of the present disclosure.

In FIG. 5C, the sleeve 552 is a full circle.

Figure 5D:
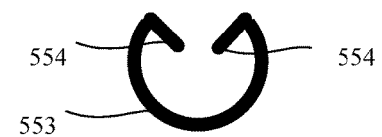
FIG. 5D illustrates a front view of another embodiment of the sleeve of the pass-through element protection system in FIG. 5A, according to an aspect of the present disclosure.

FIG. 5D illustrates a front view of another embodiment of the sleeve of the pass-through element protection system in FIG. 5A, according to an aspect of the present disclosure.

In FIG. 5D, the sleeve 553 is more than half of a circle. Additionally, pass-through element retention members 554 are shown to partially fill the opening of the sleeve 553. The pass-through element retention members 554 may be used to maintain a pass-through element within the partial enclosure of the metal casting, such as if the sleeve 553 itself would not otherwise be enough to maintain the pass-through element within the partial enclosure. The pass-through element retention members 554 shown in FIG. 5D may be provided in any embodiment in which the sleeve 553 is provided with a profile that is less than a full circle.

In any of the embodiments of FIG. 5A, FIG. 5B, FIG. 5C and FIG. 5D, the sleeves are used to maintain the pass-through element within the partial enclosure of the metal casting. Additionally, in any of these embodiments, the sleeves may also be used to partly fill any extra volume within an opening in construction stud lumber, such as if an opening is accidentally made to large for a pre-sized pass-through element protector.

Figure 6:
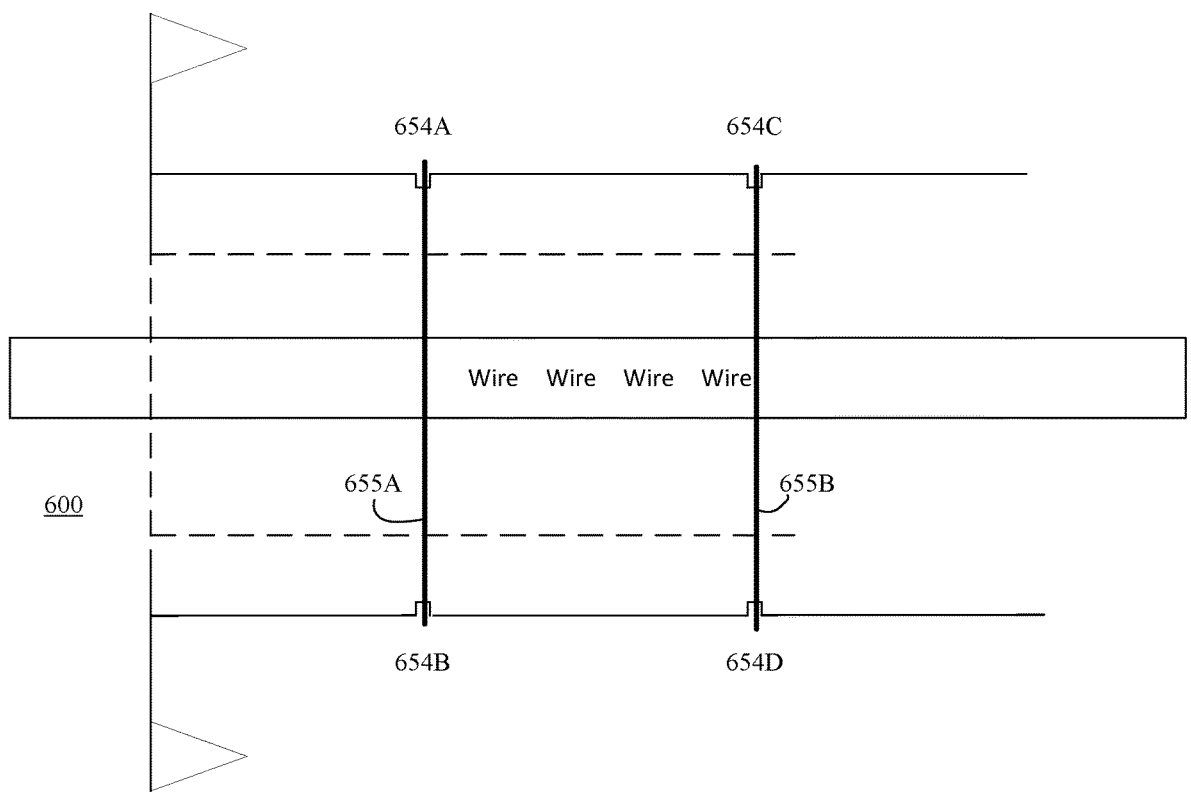
FIG. 6 illustrates a right side view of another pass-through element protection system in use, according to an aspect of the present disclosure.

FIG. 6 illustrates a right side view of another pass-through element protection system in use, according to an aspect of the present disclosure.

In FIG. 6, instead of sleeves, a first band 655A and a second band 655B are slipped over the pass-through element protection system 600. The first band 655A is held in place by two grooves in the outer surface of the metal casting, including the first notch 654A and the second notch 654B. The second band 655B is held in place by two grooves in the outer surface of the metal casting, including the third notch 654C and the fourth notch 654D. The first band 655A and the second band 655B may be flexible bands such as rubber bands.

The first band 655A and the second band 655B may also be used to retain the wire, pipe, or other pass-through element in the pass-through element protection system 600, by ensuring that the wire, pipe, or other pass-through element does not slip through the opening in the partial enclosure of the metal casting of the pass-through element protection system 600.

Figure 7A:
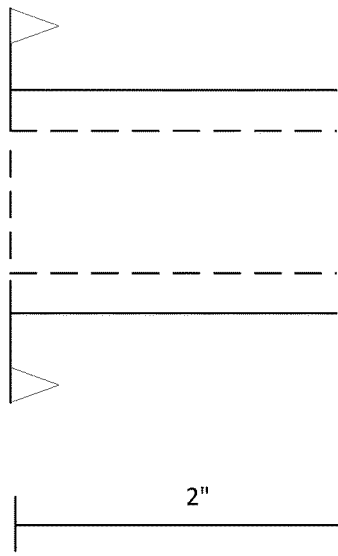
FIG. 7A illustrates a right side view of a pass-through element protection system, according to an aspect of the present disclosure.

FIG. 7A illustrates a right side view of a pass-through element protection system, according to an aspect of the present disclosure.

In FIG. 7A, the pass-through element protector 701 is configured to be inserted into 2" construction stud lumber.

Figure 7B:
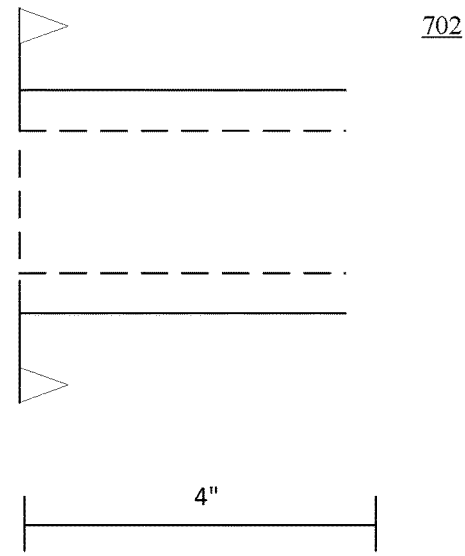
FIG. 7B illustrates a right side view of another pass-through element protection system, according to an aspect of the present disclosure.

FIG. 7B illustrates a right side view of another pass-through element protection system, according to an aspect of the present disclosure.

In FIG. 7B, the pass-through element protector 702 is configured to be inserted into 4" construction stud lumber.

Figure 7C:
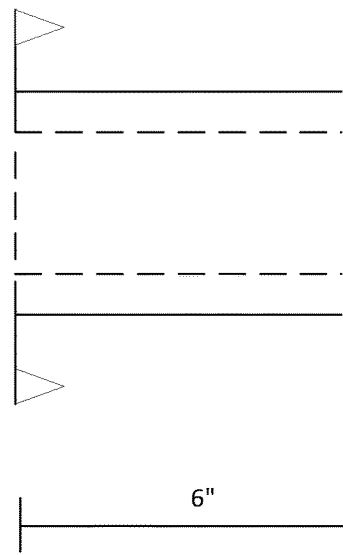
FIG. 7C illustrates a right side view of another pass-through element protection system, according to an aspect of the present disclosure.

FIG. 7C illustrates a right side view of another pass-through element protection system, according to an aspect of the present disclosure.

In FIG. 7C, the pass-through element protector 703 is configured to be inserted into 6" construction stud lumber.

Figure 7D:
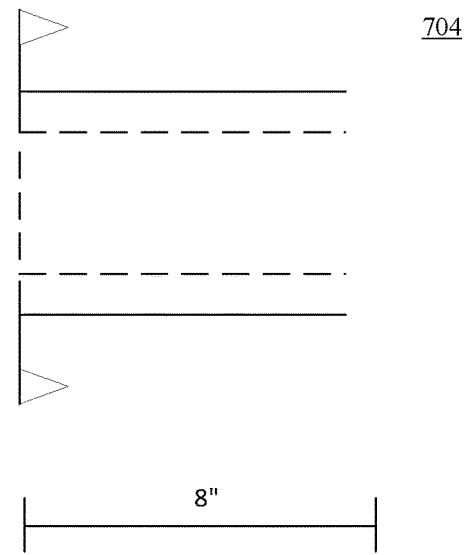
FIG. 7D illustrates a right side view of another pass-through element protection system, according to an aspect of the present disclosure.

FIG. 7D illustrates a right side view of another pass-through element protection system, according to an aspect of the present disclosure.

In FIG. 7D, the pass-through element protector 704 is configured to be inserted into 8" construction stud lumber.

As shown in FIG. 7A, FIG. 7B, FIG. 7C and FIG. 7D, a pass-through element protector may be set to match a dimension of the support structure into which the pass-through element protector is inserted. In some embodiments, the pass-through element protector 701 of FIG. 7A may be provided with the 2" dimension, and modular additions each of 2" may be provided to add to the length of the pass-through element protector 701. For example, modular pass-through element protector add-ons may be provided with threaded ends on one side, and threads on the other, so that the modular add-ons can be screwed into a threaded end of the pass-through element protector 701 or of another modular add-on. In this way, three modular additions each of 2" pass-through element protector add-ons may be provided to extend the pass-through element protector 701 with an additional 6". In another example, a pass-through element protector add-on may be provided with a dimension of 1", so that construction stud lumber with odd number dimensions such as 3" or 5" may still be provided with the full protection offered by pass-through element protectors described herein. In this way, a dimension along the central axis of a pass-through element protector described herein may be set to match a dimension of a support structure into which the pass-through element protector is inserted.

Figure 8A:
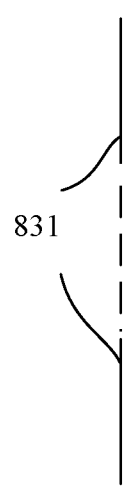
FIG. 8A illustrates a top view of a plate of a pass-through element protector, according to an aspect of the present disclosure.

FIG. 8A illustrates a top view of a plate of a pass-through element protector, according to an aspect of the present disclosure.

In FIG. 8A, an overhead profile of a plate 831 is shown to be flat, such as when the plate for a pass-through element protector is to be driven to be flat against construction stud lumber.

Figure 8B:
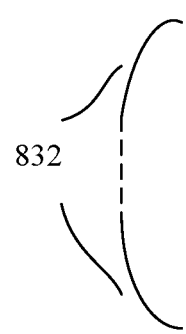
FIG. 8B illustrates a top view of another plate of a pass-through element protector, according to an aspect of the present disclosure.

FIG. 8B illustrates a top view of another plate of a pass-through element protector, according to an aspect of the present disclosure.

In FIG. 8B, an overhead profile of a plate 833 is shown to be curved, such as when the plate for a pass-through element protector is to be driven to be curved against a curved column or another support structure.

Figure 9A:
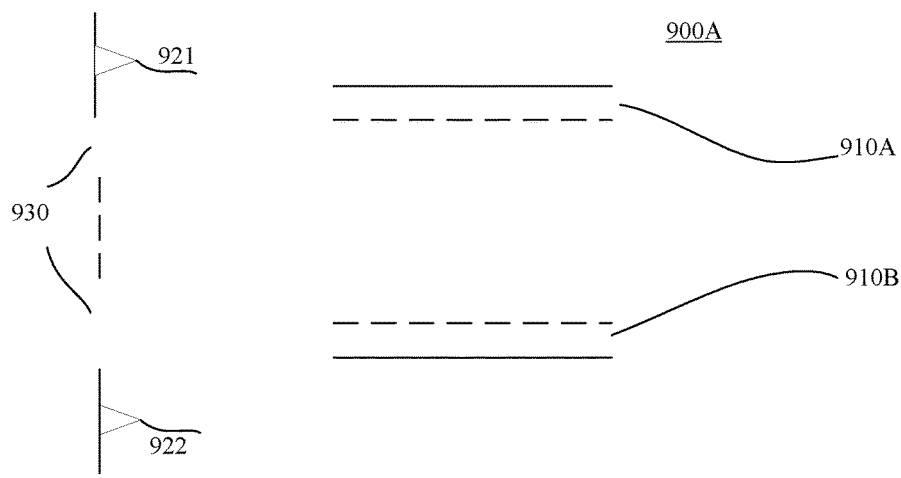
FIG. 9A illustrates a right side view of elements of a pass-through element protector, according to another aspect of the present disclosure.

FIG. 9A illustrates a right side view of elements of a pass-through element protector, according to another aspect of the present disclosure.

In FIG. 9A, a pass-through element protector 900A includes a first metal casting portion 910A, a second metal casting portion 910B, and a plate 930. A first tooth 921 and a second tooth 922 are provided on the plate 930. The pass-through element protector 900A may be provided as three separate components so that the first metal casting portion 910A and the second metal casting portion 910B may be fastened together and then installed to the plate 930. For example, the first metal casting portion 910A and the second metal casting portion 910B may be snapped together, glued together with an adhesive, soldered together, or otherwise fastened.

Embodiments based on the pass-through element protector 900A may be appropriate for protecting water pipes as well as wires. In this regard, water pipes may be made of PEX or alternatives to PEX. PEX stands for cross-linked polyethylene, and is a form of polyethylene with cross-links. PEX may be used in pipes in a variety of applications including for water piping and as insulation for tense electrical cables. Since water pipes are rigid, uniform and often curved, the pass-through element protector 900A may accommodate characteristics of some forms of pass-through elements better than other embodiments of the pass-through element protectors shown herein.

In many, and perhaps most, instances, a larger enclosure and a larger passage through the plate of the pass-through element protector will be required for water pipes than would be required for wires. Pass-through element protectors that can accommodate larger enclosures and larger passages may be provided in embodiments based on FIG. 9A, FIG. 9B, FIG. 9C and FIG. 9D.

Figure 9B:
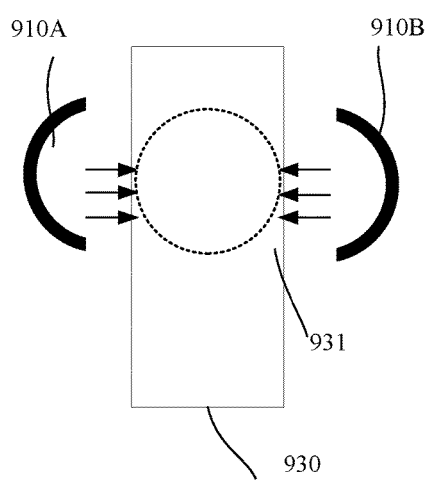
FIG. 9B illustrates a front view of one embodiment of the elements of the pass-through element protector in FIG. 9A, according to an aspect of the present disclosure.

FIG. 9B illustrates a front view of one embodiment of the elements of the pass-through element protector in FIG. 9A, according to an aspect of the present disclosure.

In FIG. 9B, the first metal casting portion 910A and the second metal casting portion 910B may form a type of sleeve when snapped together around a pipe. The plate 930 includes a cutout 931 to show where the sleeve should be placed once the first metal casting portion 910A and the second metal casting portion 910B are snapped together or otherwise fastened. The cutout 931 may be provided as a color pattern or a physical feature such as a cutout depression in the plate 930 to show where the combination of the first metal casting portion 910A and the second metal casting portion 910B should be placed, screwed in, soldered, or otherwise attached.

In an alternative embodiment, one of the first metal casting portion 910A and the second metal casting portion 910B may be pre-fastened to the plate 930. The resultant structure can be set around a pipe and the remaining one of the first metal casting portion 910A and the second metal casting portion 910B is fastened to the resultant structure.

Figure 9C:
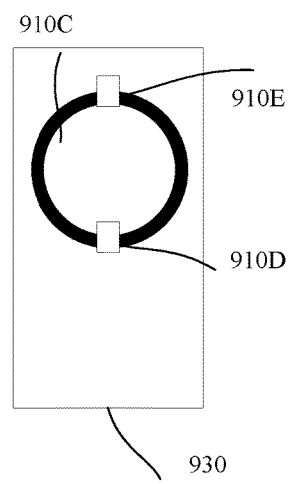
FIG. 9C illustrates a front view of another pass-through element protector, according to an aspect of the present disclosure.

FIG. 9C illustrates a front view of another pass-through element protector, according to an aspect of the present disclosure.

In embodiments based on FIG. 9C, a metal casting 910C includes two pre-fastened elements that are fastened about a hinge 910D and which can be locked with a clasp 910E. The two pre-fastened elements can be partially separated at the clasp 910E while remaining connected at the hinge 910D in order to fit around a pipe, and then fully connected at the clasp 910E.

Figure 9D:
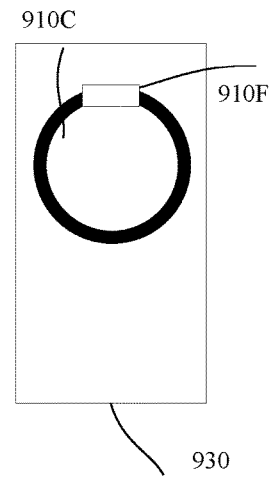
FIG. 9D illustrates a front view of another pass-through element protector, according to an aspect of the present disclosure.

FIG. 9D illustrates a front view of another pass-through element protector, according to an aspect of the present disclosure.

In embodiments based on FIG. 9D, a relatively large portion of a metal casting may be left as a gap or opening compared to the metal casting 110 in FIG. 1B. The relatively large portion may be closed once the metal casting is fitted around a pipe by inserting and locking a snap-in slot cover 910F as shown.

Embodiments based on FIG. 9A, FIG. 9B, FIG. 9C and FIG. 9D may be applicable to pipes such as PEX water pipes as well as to wires and similar alternatives which are used as pass through elements in structural elements such as framing lumber.

As should be clear, openings in metal castings and plates may need to be larger for PEX-style piping, such as due to the curved nature of PEX-style piping and similar elements. The larger diameter of the opening may be larger to ensure the curve does not prevent the pass-through element protector from fitting. Accordingly, pass-through element protectors may be provided in a variety of sizes and with a variety of configurations in order to accommodate different wiring and piping products in the market.

In embodiments based on modifications to FIG. 9A, FIG. 9B, FIG. 9C and FIG. 9D, the first metal casting portion 910A and the second metal casting portion 910B may form less than a full circle, and may instead be analogous to wings. In embodiments based on a modification to FIG. 9B, two wings may connect at one end but not the other, such as at the top and not the bottom. The two wings may form a fraction of a full circle, such as 95%, 90%, 85% or even less, and may be pushed into a corresponding structure in the cutout 931 of the plate 930. In embodiments based on a modification to FIG. 9C, two wings may hinge at one end and be open at the other, such as by being hinged at the top and open at the bottom. In embodiments based on a modification to FIG. 9D, two wings may be entirely disconnected at the top and the bottom when pushed into the cutout 931 of the plate 930, but may be joined at the top and the bottom by two instances of the snap-in slot cover 910F.

In embodiments based on modifications to FIG. 9A, FIG. 9B, FIG. 9C and FIG. 9D, any opening between the first metal casting portion 910A and the second metal casting portion 910B may be formed in a direction where protection for pass-through elements is least likely, such as at the top and/or the bottom. In this regard, the pass-through element protector may be primarily intended to protect elements from objects being driven into support structures from lateral directions, such that an opening at the top or the bottom may present the lowest amount of risk. The pass-through element protectors described herein are configured to block, or at least deflect, objects being driven into support structures.

Figure 10A:
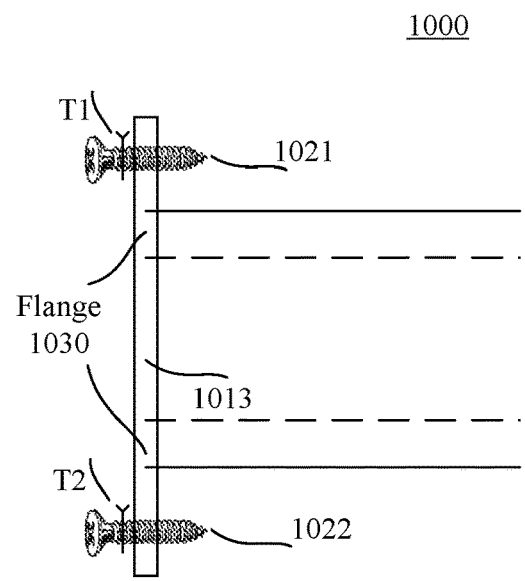
FIG. 10A illustrates a right side view of another pass-through element protection system, according to an aspect of the present disclosure.

FIG. 10A illustrates a right side view of another pass-through element protection system, according to an aspect of the present disclosure.

In FIG. 10A, the pass-through element protection system 1000 includes a flange 1030, a first self-tapping screw 1021, and a second self-tapping screw 1022. The first self-tapping screw 1021 is accompanied by a threaded metal tab T1. The second self-tapping screw 1022 is accompanied by a threaded metal tab T2. The first self-tapping screw 1021 is pre-inserted into a hole in the flange 1030 and fixed to the flange 1030 by the threaded metal tab T1. The second self-tapping screw 1022 is pre-inserted into another hole in the flange 1030 and fixed to the flange 1030 by the threaded metal tab T2. Accordingly, the pass-through element protection system 1000 may be easily fixed to a corresponding structure. Of course, the pass-through element protection system 1000 may also include other elements from other embodiments described herein, so long as the other elements are consistent with the concept of self-tapping screws as shown in FIG. 10A.

Figure 10B:
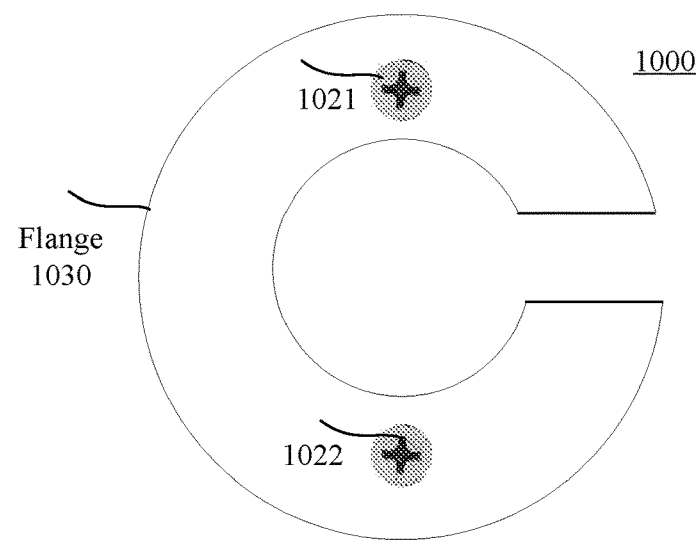
FIG. 10B illustrates a front view of the pass-through element protection system in FIG. 10A, according to an aspect of the present disclosure.

FIG. 10B illustrates a front view of the pass-through element protection system in FIG. 10A, according to an aspect of the present disclosure.

In FIG. 10B, the pass-through element protection system 1000 is shown from the front. The opening on the right side allows for a wire or pipe etc. to be inserted into the pass-through element protection system 1000 from the side. The first self-tapping screw 1021 and the second self-tapping screw 1022 are shown from their respective tops.

Figure 11A:
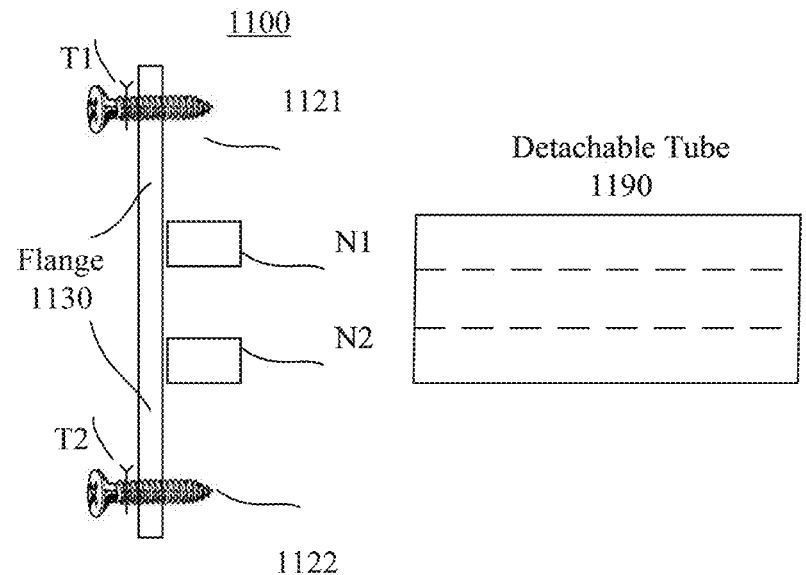
FIG. 11A illustrates a right side view of another pass-through element protection system, according to an aspect of the present disclosure.

FIG. 11A illustrates a right side view of another pass-through element protection system, according to an aspect of the present disclosure.

In FIG. 11A, the flange 1130 is again accompanies by a first self-tapping screw 1121 and a second self-tapping screw 1122, as well as a threaded metal tab T1 and a threaded metal tab T2. In Addition, a notch N1 and a notch N2 are provided on the inside of the flange 1130, as structural elements of the flange 1130. A detachable tube 1190 is configured to be attached to and detached from the flange 1130 via the notch N1 and the notch N2. For example, the detachable tube 1190 may be snapped into one and then the other of the notch N1 and the notch N2. The notch N1 and the notch N2 may include a closable latch or other locking mechanism to lock the detachable tube 1190 temporarily into place until the closable latch or other locking mechanism is unlatched/unlocked. Of course, the pass-through element protection system 1100 may also include other elements from other embodiments described herein, so long as the other elements are consistent with the concepts of self-tapping screws, a detachable tube, and notches as shown in FIG. 11A.

Figure 11B:
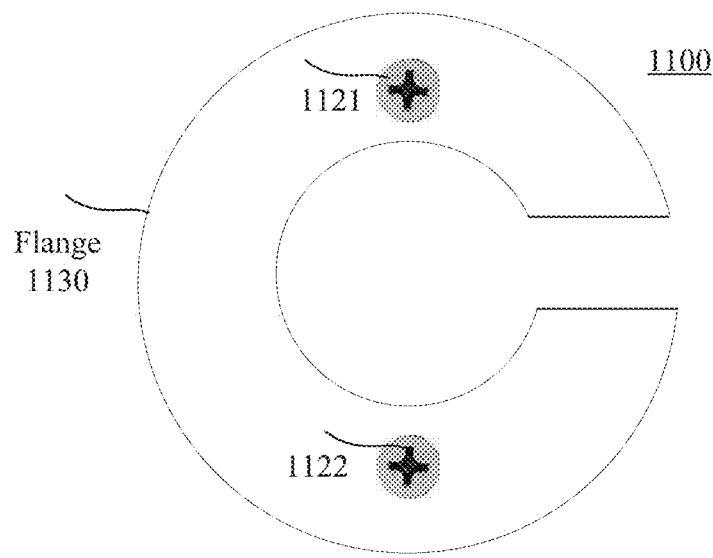
FIG. 11B illustrates a front view of the pass-through element protection system in FIG. 11A, according to an aspect of the present disclosure.

FIG. 11B illustrates a front view of the pass-through element protection system in FIG. 11A, according to an aspect of the present disclosure.

In FIG. 11B, the pass-through element protection system 1100 is shown from the front. The opening on the right side again allows for a wire or pipe etc. to be inserted into the pass-through element protection system 1100 from the side. The first self-tapping screw 1221 and the second self-tapping screw 1122 are shown from their respective tops relative to the outside of the flange 1130 in FIG. 11B.

Figure 12A:
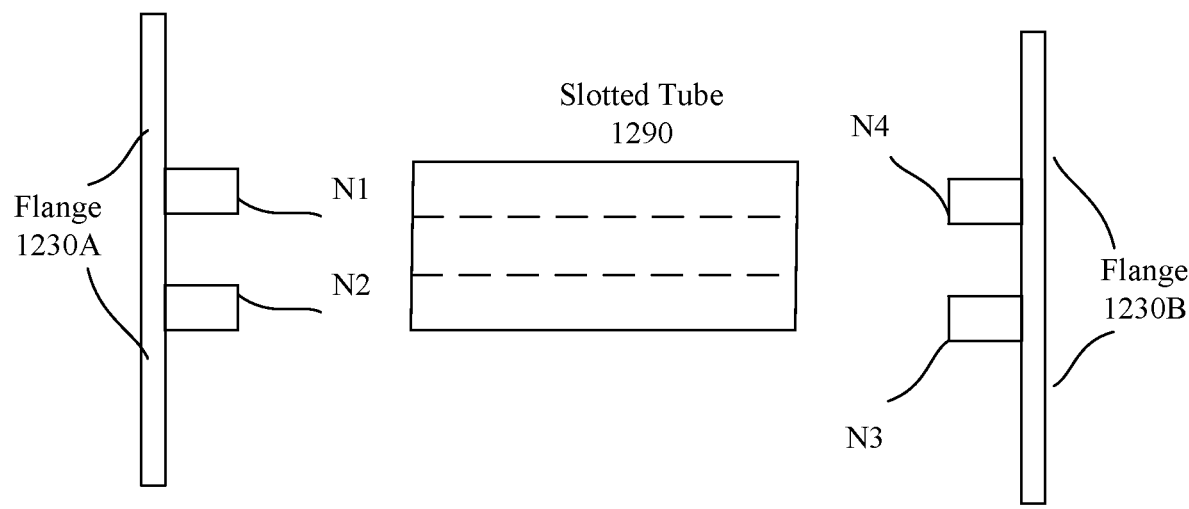
FIG. 12A illustrates a right side view of another pass-through element protection system, according to an aspect of the present disclosure.

FIG. 12A illustrates a right side view of another pass-through element protection system, according to an aspect of the present disclosure.

In FIG. 12A, the flange 1230A is again provided with a notch N1 and a notch N2, as structural elements of the flange 1230A. In FIG. 12A, another flange 1230 B is provided opposite the flange 1230A and is provided with a notch N3 and a notch N4, as structural elements of the flange 1230B. A slotted tube 1290 is configured to be inserted into the notch N1, the notch N2, the notch N3 and the notch N4. For example, the slotted tube 1290 may be snapped into one and then the other of the notch N1 and the notch N2 from one side, and then into one and then the other of the notch N3 and the notch N4 from the other side. Each of the notch N1, the notch N2, the notch N3 and the notch N4 may include a closable latch or other locking mechanism to lock the detachable tube 1190 temporarily into place until the closable latch or other locking mechanism is unlatched/unlocked. Of course, the pass-through element protection system 1200 may also include other elements from other embodiments described herein, so long as the other elements are consistent with the concepts of a slotted tube, and notches as shown in FIG. 12A.

Figure 12B:
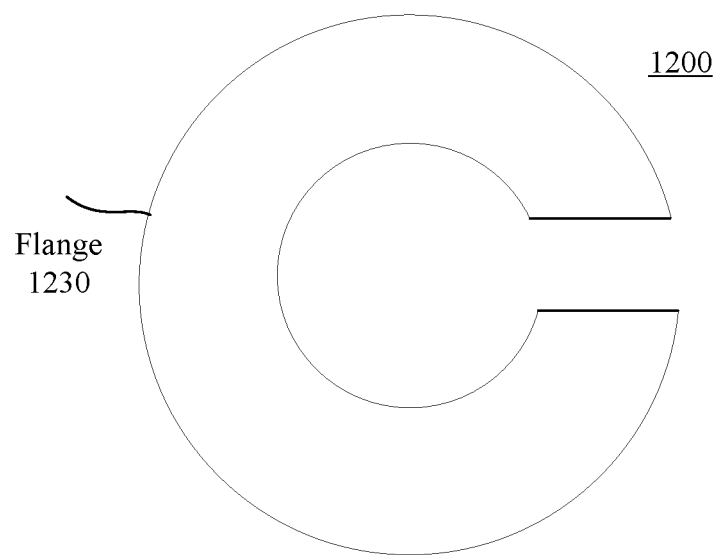
FIG. 12B illustrates a front view of the pass-through element protection system in FIG. 12A, according to an aspect of the present disclosure.

FIG. 12B illustrates a front view of the pass-through element protection system in FIG. 12A, according to an aspect of the present disclosure.

In FIG. 12B, the pass-through element protection system 1200 is shown from the front. The opening on the right side again allows for a wire or pipe etc. to be inserted into the pass-through element protection system 1200 from the side. Notably, there are no self-tapping screws or other elements on the outside of the flange 1230 shown in FIG. 12B.

In another set of embodiments based on or similar to FIG. 12A and FIG. 12B, instead of two flanges (i.e., the flange 1230A and the flange 1230B), only one of these two flanges is provided. The slotted tube 1290 may be an outer tube, and an inner tube may be provided substantially within the slotted tube 1290 as the outer tube. The inner tube may be rotatable within the slotted tube 1290, and may be rotated to block the opening on the right side in FIG. 12B. For example, the inner tube may also have an opening so that a wire or pipe may be inserted into the pass-through element protection system 1200 when the opening of the inner tube aligns with the opening of the slotted tube 1290, and so that the inner tube may thereafter be rotated to block the opening of the slotted tube 1290.

Accordingly, a pass-through element protector enables protection for pass-through elements passed through support structures such as construction stud lumber during construction. The pass-through element protectors may be produced as hardware with standardized sizes, and sold for a low cost similar to other types of standardized hardware.

Although pass-through element protector has been described with reference to several exemplary embodiments, it is understood that the words that have been used are words of description and illustration, rather than words of limitation. Changes may be made within the purview of the appended claims, as presently stated, and as amended, without departing from the scope and spirit of pass-through element protector in its aspects. Although pass-through element protector has been described with reference to particular means, materials and embodiments, pass-through element protector is not intended to be limited to the particulars disclosed; rather pass-through element protector extends to all functionally equivalent structures, methods, and uses such as are within the scope of the appended claims.

For example, pass-through element protectors may be produced as single composite pieces with plates and metal castings integrated together in production, but the pass-through element protectors described herein are not limited to single composite pieces. Rather, plates may have threads built in so that metal castings with threaded ends may be screwed into the plates via the threads and threaded ends. In this way, a plate may be configured for use with metal castings of different lengths for different sizes of construction stud lumber.

The illustrations of the embodiments described herein are intended to provide a general understanding of the structure of the various embodiments. The illustrations are not intended to serve as a complete description of all the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for streamlining the disclosure. This disclosure is not to be interpreted as reflecting an intention that the claimed embodiments require more features than are expressly recited in each claim. Rather, as the following claims reflect, inventive subject matter may be directed to less than all the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A pass-through element protector, comprising:
    a metal casting formed as a partial enclosure around a central axis with an inner surface facing the central axis and an outer surface facing away from the central axis;
    an opening in the partial enclosure from the inner surface to the outer surface;
    a plate at least partially closing the partial enclosure at one end along the central axis, and
    a plurality of teeth on the plate facing the partial enclosure to fasten the pass-through element protector to a support structure.

2. The pass-through element protector of claim 1, wherein the pass-through element protector is configured to be slipped over an existing pass-through element so that the opening faces upwards or downwards when the existing pass-through element is inserted into the support structure so as to protect the existing pass-through element from contact with hardware subsequently being inserted into the support structure.

3. The pass-through element protector of claim 1, wherein the pass-through element protector is configured to be slipped over an existing pass-through element to protect a portion of the existing pass-through element before the portion of the existing pass-through element is inserted into a support structure.

4. The pass-through element protector of claim 1,
    wherein the pass-through element protector is configured to be inserted into construction stud lumber with a pass-through element partially enclosed within the pass-through element protector along the central axis.

5. The pass-through element protector of claim 1,
    wherein the opening is formed throughout the pass-through element protector along the central axis.

6. The pass-through element protector of claim 1, wherein a dimension of the pass-through element protector along the central axis is set to match a dimension of a support structure into which the pass-through element protector is inserted.

7. The pass-through element protector of claim 1,
    wherein the plate is arranged perpendicular to the central axis, and the plurality of teeth are substantially aligned with the outer surface and the inner surface.

8. The pass-through element protector of claim 1,
    wherein a dimension of the pass-through element protector along the central axis is adjustable so that the dimension of the pass-through element protector matches a dimension of a support structure into which the pass-through element protector is inserted.

9. The pass-through element protector of claim 1, further comprising:
    a sleeve configured to be slipped within the partial enclosure along the central axis to close the opening.

10. The pass-through element protector of claim 1, further comprising:
    a sleeve configured to be slipped around the partial enclosure along the central axis to close the opening.

11. The pass-through element protector of claim 1,
    wherein the plate comprises at least one ring installed at the one end of the metal casting to partially close the opening.

12. The pass-through element protector of claim 1, further comprising:
    self-tapping screws configured to attach the plate to a support structure in which the pass-through element protector is inserted.

13. The pass-through element protector of claim 1, wherein the plate is detachable from the metal casting.

14. The pass-through element protector of claim 13, wherein the plate comprises a thread into which the metal casting is threaded.

15. A pass-through element protection system, comprising:
    a pass-through element protector which includes:
        a metal casting formed as a partial enclosure around a central axis with an inner surface facing the central axis and an outer surface facing away from the central axis;
        an opening in the partial enclosure from the inner surface to the outer surface;
        a plate at least partially closing the partial enclosure at one end along the central axis, and
        a plurality of teeth on the plate facing the partial enclosure to fasten the pass-through element protector to a support structure; and a pass-through element retention member configured to retain a pass-through element within the partial enclosure by at least partially covering the opening in the partial enclosure.

16. The pass-through element protection system of claim 15, wherein the pass-through element retention member includes at least one band fitted around the outer surface of the metal casting within at least one groove in the metal casting.

17. The pass-through element protection system of claim 15, wherein the pass-through element retention member comprises a sleeve placed around the outer surface of the metal casting to cover the opening in the partial enclosure.

18. The pass-through element protection system of claim 17, further comprising:
at least one retention member which partially closes an opening in the sleeve.

* * * * *